United States Patent

[11] 3,523,475

| | | |
|---|---|---|
| [72] | Inventors | Berthold Leibinger<br>Gerlingen, Germany;<br>Eugen Herb, Ditzingen, Germany;<br>Wolfgang Eichenbrenner, Stuttgart-Weilimdorf, Germany |
| [21] | Appl. No. | 710,142 |
| [22] | Filed | March 4, 1968 |
| [45] | Patented | Aug. 11, 1970 |
| [73] | Assignee | Trumpf & Co<br>Stuttgart-Weilimdorf, Germany |
| [32] | Priority | March 3, 1967 |
| [33] | | Germany |
| [31] | | No. 1,627,294 |

[54] NIBBLING TOOL WITH RECESSED PUNCH
9 Claims, 2 Drawing Figs.

[52] U.S. Cl. ........................................ 83/467,
83/635, 83/916
[51] Int. Cl. .................................... B26d 7/16
[50] Field of Search .......................... 83/237,
916, 467, 267, 268, 635; 30/228, 233, 241

[56] References Cited
UNITED STATES PATENTS
1,476,246  12/1923  Gray ........................ 83/916X
2,217,393  10/1940  Webb ........................ 30/241
2,278,174   3/1942  Gray ........................ 30/228

*Primary Examiner*— James M. Meister
*Attorney*—Mc Glew and Toren

ABSTRACT: A nibbling tool has a punch guided for reciprocation on a die holder carrying a work feed limiter in the form of a relatively narrow rib or strip. The surface of the punch facing the work feed limiter is formed with a recess extending longitudinally of the direction of reciprocation of the punch, and this recess has a cross sectional area greater than the cross sectional area of the work feed limiter so that the punch does not contact the work feed limiter but bears on surfaces disposed laterally of the work feed limiter.

The work feed limiter is interchangeably mounted on the die holder, as by being formed on a detachable plate positioned in a recess in the die holder, this recess having a depth corresponding substantially to the thickness of the plate. Preferably, the plate carrying the work feed limiter can be inverted in its recess or can be so formed that it may be turned around in its recess whereby when the wear on the surface facing the punch reaches a preset value, a new punch-engaging surface can be presented.

3,523,475

NIBBLING TOOL WITH RECESSED PUNCH

BACKGROUND OF THE INVENTION

A known nibbling tool, of the type to which the present invention is directed, includes a punch, having a cutting edge, and this punch has bearing engagement, during reciprocation, with a work feed limiter. With this arrangement, the work feed limiter is subjected to heavy wear, with the result that the feed of the workpiece for successive strokes of the punch is increased, thereby increasing the force required to effect the nibble and imposing a greater load or stress on the holder. At the same time, the cutting edge geometry changes so that, with full utilization of the feed, an "overcutting" occurs which prevents or hinders feed movement of the nibbling tool and may, in extreme cases, even render feed movement impossible. Therefore, when a relatively small part of the tool, such as the work feed limiter, is worn, a large expensive part, such as the die holder, must be replaced.

Another disadvantage of this known construction is that the work feed limiter, in order to be able to fulfill its guiding function, must be of adequate size. In turn, this means a deep gouge or cut and hence weakening of the punch. Therefore, in order to make the punch breakage-proof, its cross section must be correspondingly enlarged. As a result, there is an undesirable increase of the power required to drive the nibbling tool and of the nibbling forces.

In a known form of construction, the feed limitation function is performed by a special element. This special element is a component part of the oscillating nibble punch and, as a result, relatively great friction occurs which greatly increases the danger of breakage of the punch and of this element. Additionally, it is difficult and expensive to regrind the punch. It should also be mentioned that the distance of the power center from the area center of gravity of the holder yoke is relatively great. For this reason, the usually trapezoidal cross section of the die holder must be made relatively long, resulting in a poor curve pattern of the machine, i.e., a relatively large minimum radius.

Another known nibbling tool operates without a special work feed limiter, and the work feed limiting function is performed by the end face of the die holder yoke extending in the working direction. When cutting curves, the feed path of this nibbling tool becomes too long. As a result, the punch lets stand, at least on one side, i.e., at the large radius of the punched-out groove, material parts which prevent or render entirely impossible any further feed movement. With increasing wear of the front limiting face of the die holder yoke, this disadvantageous effect is further intensified. To moderate this described disadvantageous operation, at least in part, the die holder yoke is made especially narrow. This corrective measure entails the disadvantage of poorer lateral guiding, the consequence of which is an imperfectly cut edge. Moreover, the cross section of the yoke, viewed in the feed direction, must be enlarged to withstand the load imposed thereon, and this results again in an inferior curve pattern.

SUMMARY OF THE INVENTION

This invention relates to nibbling tools and, more particularly, to a novel and improved nibbling tool having a punch guided on a die holder and formed with a longitudinally extending recess receiving a work feed limiter and having a cross sectional area greater than that of the work feed limiter.

In accordance with the invention, spanning of the work feed limiter by the punch without contact between the punch and the work feed limiter is effected by making the cross section of the groove in the punch greater than the cross section of the work feed limiter. Laterally of the work feed limiter, the punch is supported on rear guide surfaces. Since, due to such support on the rear guide surfaces, the longitudinal groove in the punch is no longer in contact with the work feed limiter, the punch no longer imposes any wear on the work feed limiter. Consequently, the work feed limiter, as well as the groove in the punch, can be maintained at a small value. The result is that the notch sensitivity of the punch is reduced and, as a result, its cross section can also be reduced so that the driving power can be kept small.

In further accordance with the invention, the work feed limiter is disengageably mounted on the die holder, and advantageously is formed on a detachable plate arranged in a depression in the die holder, this depression having a depth corresponding approximately to the plate thickness. In addition, the work feed limiter has, in a known manner, a strip-type shape. The ready exchangeability of the work feed limiter and its mounting plate insures that, when the work feed limiter is worn by the workpiece with the resultant disadvantages mentioned above, only the relatively cheap plate, rather than the expensive die holder, need be replaced. Moreover, by proper selection of the work feed limiter, a variation of the amount of feed of the workpiece during each stroke can be attained, insofar as the groove in the punch will permit.

In accordance with a further feature of the invention, the plate also provides the rear guide faces for the punch, so that those parts subjected to wear can be replaced easily and cheaply. The plate advantageously is designed symmetrically with a plane perpendicular to the direction of punch movement, so that it can be arranged in its depression rotated by 180° if the feed limiter is worn in places. If desired, the plate may be designed to be identical on its front and rear surfaces so that it can be not only rotated but also turned around.

It is also particularly advantageous if, viewed in the driving direction of the punch, a detachable front and lateral guide for the punch are arranged above the feed limiter. As these guides also are subject to wear, it is desirable to make them also exchangeable. To simplify the production and installation of these guides they are, in accordance with a further feature of the invention, made in one piece. Additionally, the front and lateral guide covers at least the upper part of the work feed limiter plate and thereby presses the latter into its depression. Thereby further securement of the plate can be dispensed with and, moreover, falling out of the plate is also prevented by the punch itself.

To maintain the notched tensions of the punch as low as possible, it is advantageous that the groove of the punch presents a circular arc-shaped cross section.

An object of the present invention is to provide an improved nibbling tool having a recessed punch.

Another object of the invention is to provide such a nibbling tool in which the cross section of the groove or recess in the punch is greater than the cross section of a work feed limiter.

A further object of the invention is to provide such improved nibbling tool in which the punch is supported on rear guide surfaces.

Yet, another object of the invention is to provide such a nibbling tool in which the work feed limiter is detachably mounted on the die holder.

A further object of the invention is to provide such an arrangement in which the work feed limiter is formed on a detachable plate arranged in a recess or channel in the die holder.

Still another object of the invention is to provide such an improved nibbling tool in which parts subjected to wear may be readily interchanged or replaced.

A further object of the invention is to provide a nibbling tool in which, by proper selection of the work feed limiter, a variation in the amount of feed of the workpiece can be attained.

Still another object of the invention is to provide a nibbling tool in which the work feed limiter is formed on a plate mounted in a recess in the die holder, with the plate being designed symmetrically with a plane perpendicular to the direction of punch movement so that it can be rotated, relative to the recess, through 180° if the feed limiter is worn in places.

A further object of the invention is to provide a nibbling tool of the type just-mentioned in which the feed limiter mounting plate may be designed identically on its front and rear surfaces so that it can be not only rotated but also turned around.

An ancillary object of the invention is to provide such a nibbling tool in which the groove or recess of the punch has a circular arc-shaped cross section.

BRIEF DESCRIPTION OF THE DRAWINGS

For an understanding of the principles of the invention, reference is made to the following description of a typical embodiment thereof as illustrated in the accompanying drawings.

In the Drawings.

DESCRIPTION OF THE PREFERRED EMBODIMENT

Figure 1:
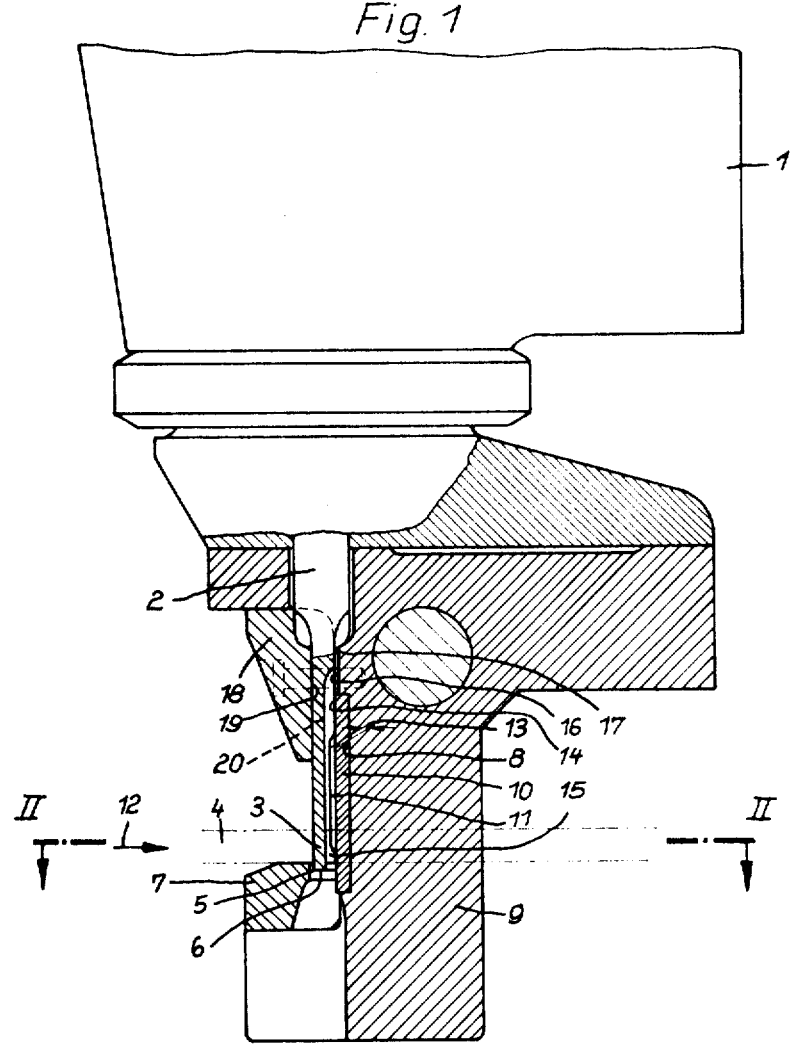
FIGURE 1 is a partial side elevation view, partially in section, of a nibbling tool embodying the invention.
Figure 2:
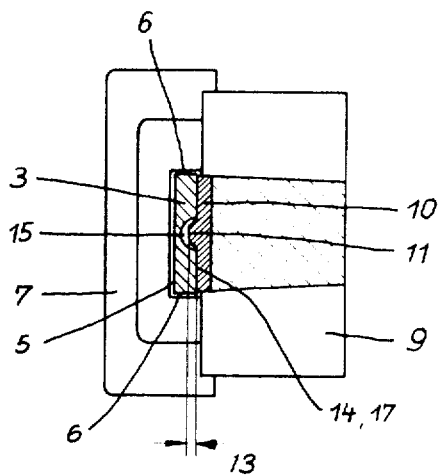
FIG. 2 is a horizontal sectional view taken along the line II-II of FIG. 1

Referring to the drawings, the head 1 of the nibbling tool accommodates the eccentric drive for the punch 2, in a manner not shown in detail. By virtue of this drive, the punch executes, in the illustrated position, an up and down movement or vertical reciprocation. The free end 3 of the punch penetrates the workpiece 4, shown in dash-dot lines, and, with its front cutting edge 5 and lateral cutting edges 6, the free end of the punch stamps out of the workpiece a chip corresponding to at least a portion of the cross section of the punch. In a curved punch, of course, cutting edges 5 and 6 would be interconnected by a gradual transition section.

In the machining operation, workpiece 4 is supported on a removable bottom die 7 which presents correspondingly shaped counter edges. There is also provided a hold down (not shown) which prevents the workpiece sheet from rising during the upward stroke of the punch. To limit the feed movement of the workpiece 4, a plate 10, having a strip-type work feed limiter 11 thereon, is inserted into a recess or depression 8 in die holder part 9. Workpiece 4 is inserted, in the direction of arrow 12, between die 7 and the hold down until it abuts against the strip-type feed limiter rib 11, with the punch pulled up or retracted.

With the downward stroke of the punch, a small piece is stamped out of the workpiece and, after the subsequent upward stroke of the punch, the workpiece 4 can be advanced by an amount corresponding to the length of the small stamped-out piece measured in the direction of arrow 12. This length is equal to the thickness of punch 2, measured in the direction of arrow 12, less the distance 13 through which feed limiter 11 extends forwardly of the rear guide surface 14 of punch 2. As feed limiter 11, which has a trapezoidal cross section, extends forwardly of the rear guide face 14 of punch 2, this rear guide face is formed with a longitudinal groove 15 of circular arc-shaped cross section.

Plate 10 is designed symmetrically in a plane perpendicular to the direction of punch movement, so that it can be arranged in recess 8 rotated by 180°. Rear guide faces 14 extend slightly beyond the wall face 16 of die holder 9 so that the only wear areas in contact with each other are the punch face 17 and the rear guide faces 14. Both parts are thus easily replaceable when worn.

For guiding punch 2, which has a substantially rectangular cross section, there is provided further a guide piece 18, which is also interchangeable, and which presents a front guide surface 19 and two lateral guide surfaces 20. Thereby, all parts subject to wear can be easily exchanged and also can be manufactured inexpensively. In addition, and because of this construction, the limiting of the work feed as well as the front and lateral guiding are effected by separate parts, whereby interaction, at increasing wear, of one of the parts is eliminated. The only forces which die holder 9 must still transmit to the upper part of the nibbling tool are those occurring during nibbling. Thus, a long life of this relatively expensive structural part is assured.

While a specific embodiment of the invention has been shown and described in detail to illustrate the application of the principles of the invention, it will be understood that the invention may be embodied otherwise without departing from such principles.

We claim:

1. In a nibbling tool including a reciprocable punch, means, including a die holder, guiding the punch and a work feed limiter spanned by a groove extending longitudinally of the rear surface of the punch, the improvement comprising, in combination, said die holder having a surface facing said punch formed with a substantially rectangular cross section recess extending longitudinally of said punch; and a substantially flat wear plate removably seated in said recess and having a thickness of the order of the depth of said recess, said plate having a rib extending longitudinally of at least one substantially flat surface thereof, longitudinally of said punch, and constituting a work feed limiter spanned by said groove in said punch; said plate being formed symmetrically with respect to a plane perpendicular to the direction of reciprocation of said punch whereby said plate may be inverted in said recess to compensate for wear on said limiter.

2. In a nibbling tool, the improvement claimed in Claim 1, in which the plate surface, on opposite sides of each rib, forms bearing surfaces engageable with the rear surfaces of said punch.

3. In a nibbling tool, the improvement claimed in Claim 2, in which the thickness of said plate is slightly greater than the depth of said recess whereby said plate has a surface located outwardly of said die holder to prevent engagement of the rear surfaces of said punch with said die holder.

4. In a nibbling tool, the improvement claimed in Claim 1, in which said punch groove has a transverse cross section greater than that of said limiter, whereby the rear surface of said punch is out of contact with said limiter.

5. In a nibbling tool, the improvement claimed in Claim 1, further including a front guide and a lateral guide for said punch mounted on said die holder above said work feed limiter, as viewed in the driving direction of said punch.

6. In a nibbling tool, the improvement claimed in Claim 5, in which said said front guide and said lateral guide are formed as a single piece.

7. In a nibbling tool, the improvement claimed in Claim 5, in which said front guide and lateral guide snugly engage the outer surface of at least the upper part of said plate.

8. In a nibbling tool, the improvement claimed in Claim 1, in which said longitudinal groove has a circular arc-shaped cross section.

9. In a nibbling tool, the improvement claimed in Claim 2, in which said plate has a respective said rib on each of its substantially flat surfaces, whereby said plate may be positioned in said recess with either of its flat surfaces exposed.